United States Patent [19]

Tanaka et al.

[11] Patent Number: 4,572,623
[45] Date of Patent: Feb. 25, 1986

[54] OBJECTIVE LENS FOR OPTICAL DISC
[75] Inventors: Masashi Tanaka, Kawasaki; Hiroshi Ohki, Tokyo, both of Japan
[73] Assignee: Nippon Kogaku K.K., Tokyo, Japan
[21] Appl. No.: 590,773
[22] Filed: Mar. 19, 1984
[30] Foreign Application Priority Data
Mar. 24, 1983 [JP] Japan ................... 57-49493
[51] Int. Cl.$^4$ .................... G02B 9/06; G02B 21/02
[52] U.S. Cl. .................... 350/480; 350/410; 350/414
[58] Field of Search .............. 350/480, 414, 410
[56] References Cited
U.S. PATENT DOCUMENTS
1,620,339  3/1927  Frederick et al. .......... 350/480
4,270,843  6/1981  Goto .................... 350/480
4,484,803  11/1984  Arai .................... 350/480

Primary Examiner—John K. Corbin
Assistant Examiner—Rebecca D. Gass
Attorney, Agent, or Firm—Shapiro and Shapiro

[57] ABSTRACT

An objective lens for detecting information recorded on an optical disc at high density, comprises, in succession from farther conjugate point side of the objective lens toward nearer conjugate point side, first lens composed of a positive lens and a negative lens cemented together and having a positive total refractive power, and second lens of a positive meniscus lens whose concave surface faces toward the nearer conjugate point side. The objective lens further satisfies the certain conditions.

6 Claims, 5 Drawing Figures

OBJECTIVE LENS FOR OPTICAL DISC

BACKGROUND OF THE INVENTION

1. Field of the Invention

The present invention relates to an objective lens for reading information on an optical disc (disc having information recorded at high density), and more particularly, to an objective lens for reading information on a compact disc as whose light source semiconductor laser is used.

2. Description of the Prior Art

An objective lens for reading information on an optical disc needs high resolving power in order to detect very small information recorded on the optical disc at high density. In addition, the objective lens itself need be small in size and light in weight, since the lens is caused to be moved in order to effect automatic condensing function and tracking function. Also it is necessary to lengthen working distance as long as possible in order not to produce contact between the optical disc and the objective lens. Even if there are incomplete light source and imperfect optical axis of the objective lens, and errors in arranging the optical axis of the objective lens with respect to the optical disc surface, good correction of aberration with respect to angle of view more than a predetermined angle is needed in order to obtain good signal information.

On the one hand, in order that a great deal of compact disc players are supplied as consumer appliance the objective lens which is cheap and keeps stable in function is required. However, since in the objective lens of this kind each lens component bears excessive burden of aberration, affection of tolerance in actual producing is great, so that good signal in use is not obtained often, and excessive adjustment is forced for increasing producing performance of the lens so that an inexpensive supply of the lens can not be effected.

An objective lens of two-component three-lens structure has been known by, for example, U.S. Pat. No. 4,270,843 (corresponding to the Japanese laid-open patent application No. 4068/1980). This objective lens has a numerical aperture (N.A.) in the range of 0.45 to 0.5 and is small in size and light in weight. However, since somewhat irregularity in aberration balance is, remarkably high degree of accuracy is needed in stages of production and assembling. Accordingly, this objective lens is insufficient still to keep quality of the lens stable and high in mass production.

SUMMARY OF THE INVENTION

An object of the present invention is to provide an objective lens in which various aberrations are well corrected while satisfying condition in specification of numerical aperture of 0.45 to 0.5 and yet in which few variation of performance in actual production is and high stable performance can be kept.

DETAILED DESCRIPTION OF THE PREFERRED EMBODIMENTS

An objective lens according to the present invention is of two-component three-lens structure.

Figure 1:
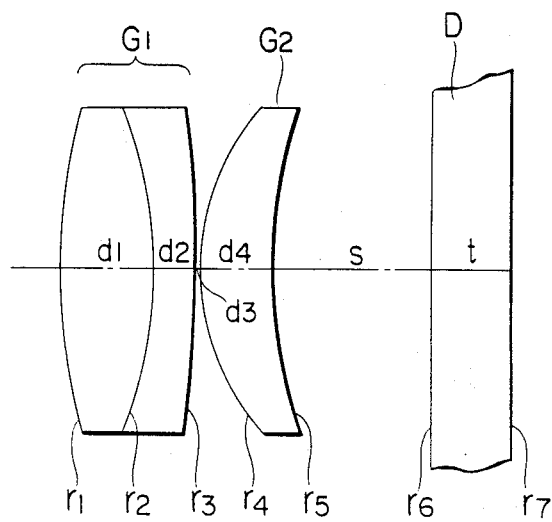
FIG. 1 shows a cross-sectional view of an objective lens according to the present invention.
Figure 2:
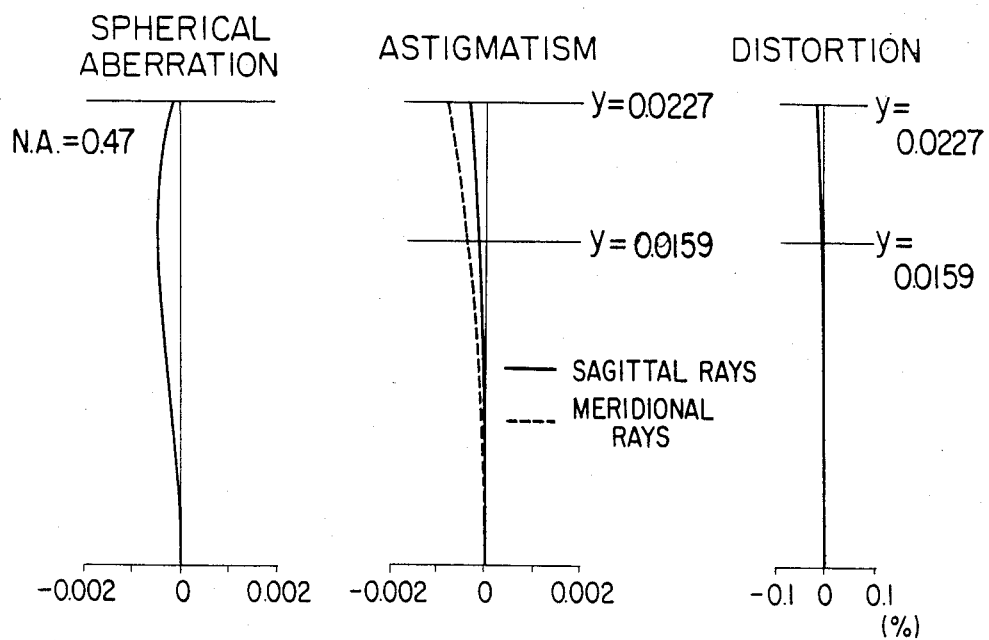
FIGS. 2 to 5 shows various aberration graphs of the first to fourth embodiments according to the present invention, respectively.
Figure 2:
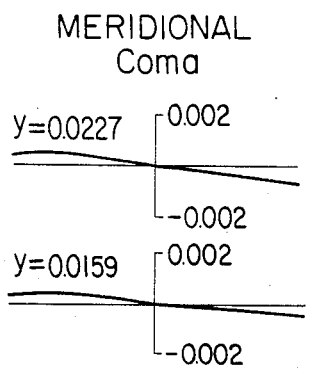
Figure 2:
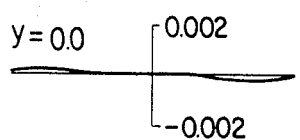
Figure 3:
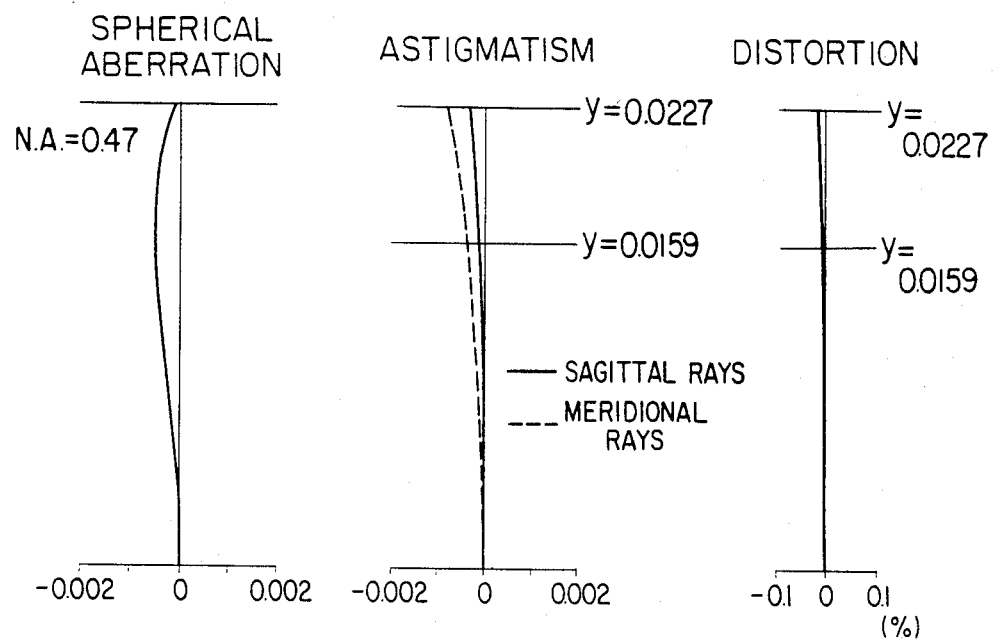
Figure 3:
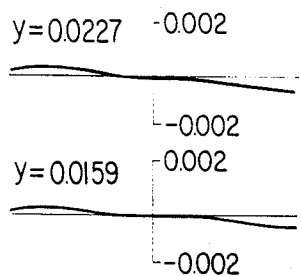
Figure 3:
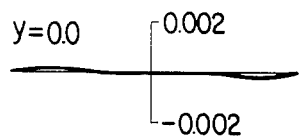
Figure 4:
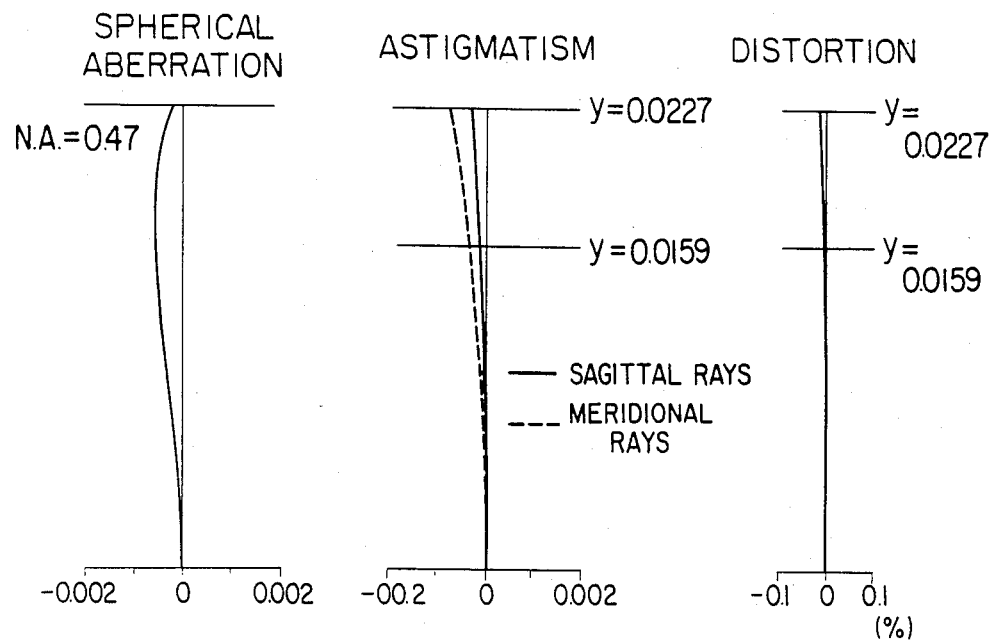
Figure 4:
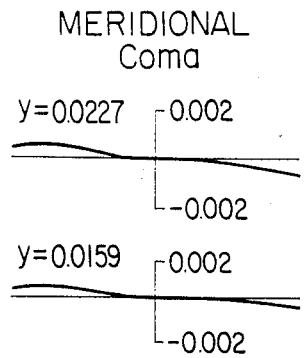
Figure 4:
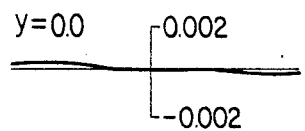
Figure 5:
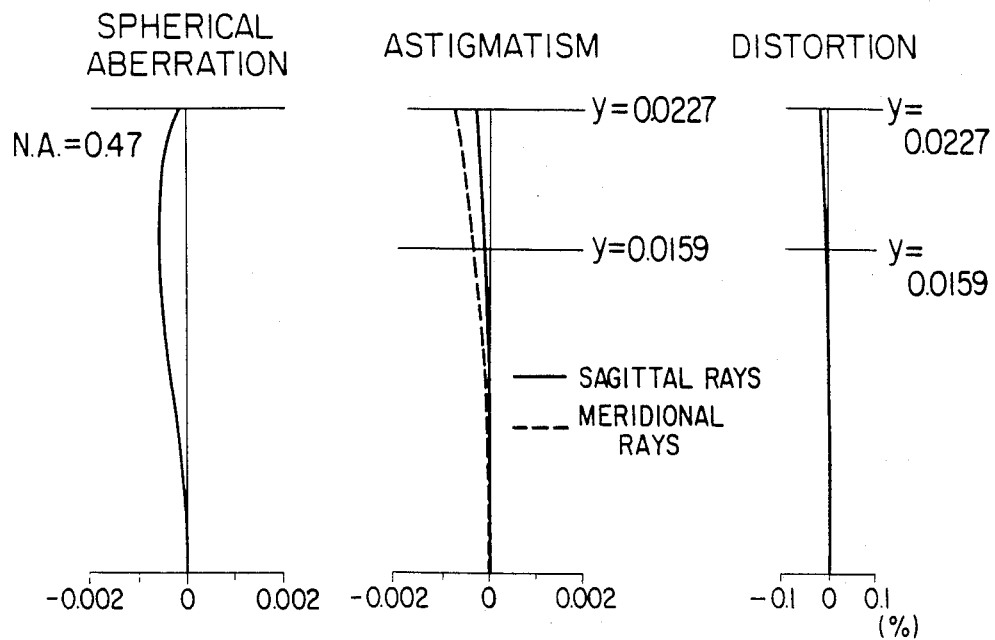
Figure 5:
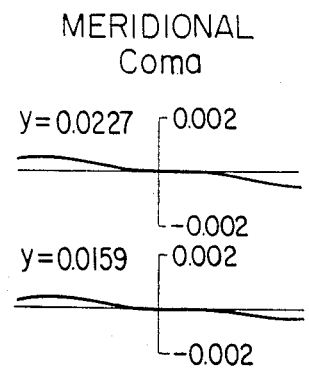
Figure 5:
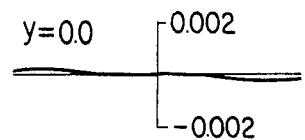

Specifically, as shown in FIG. 1, the objective lens is composed of, in succession from the farther conjugate point side (at the left side in the figure), a first component $G_1$ of a positive cemented lens of a positive lens and a negative lens cemented together and a second component $G_2$ of a positive meniscus lens whose concave surface faces toward nearer conjugate point side, that is, an optical disc (D) side. The objective lens according to the present invention satisfies the following conditions:

$$1.1 \leq \frac{r_3 + r_2}{r_3 - r_2} \leq 2.0 \quad (1)$$

$$2.1 \leq \frac{r_5 + r_4}{r_5 - r_4} \leq 3.5 \quad (2)$$

wherein $r_2$, $r_3$ represent radii of curvature of a cemented surface of the first component $G_1$ and of the surface of nearer conjugate point side (optical disc side) thereof, respectively and $r_4$, $r_5$ show radii of curvature of the surface of farther conjugate point side of the second component $G_2$ and of nearer conjugate point side (optical disc side) thereof, respectively.

It is necessary for the objective lens according to the present invention to keep the resolving power of actually produced objective lens approximate to the best designed value of the resolving power. This is nothing but small sensitivity (amount of deterioration in performance) with respect to manufacturing tolerance. To solve it in the present invention, aberrations created in each surface of lenses and in each component are made those of low order and in addition the absolute values thereof are made smaller. Further, the producing of high order due to the variations in lens parameters is made as little as possible. Specifically, by prescribing the shapes of the negative meniscus lens in the first component $G_1$ and of the positive meniscus lens in the second component $G_2$ as stated in the above conditions, good balance as an entire system is attained while, in particular, spherical aberration is made of low order and small value at each surface and at each lens component and therefore, the other various aberrations can be well corrected also.

The condition (1) relates to the shape of negative lens in the first component $G_1$ and is provided for reducing spherical aberration apt to occurring at third surface $r_3$ and fifth surface $r_5$ of the objective lens according to the present invention and for decreasing the correcting amount at second surface $r_2$ of the cemented surface in response thereto. If the lower limit in the condition (1) is exceeded, the producing of spherical aberration at the third surface $r_3$ is small. However, the production of spherical aberration at the fifth surface $r_5$ must be made large by over correction at the second surface $r_2$, so that amount of absolute aberration at each component become greater and it will be difficult to keep stabler performance in the producing of the lens even if the absolute aberration can be well corrected.

If the upper limit is exceeded, spherical aberration at the third surface $r_3$ is too large and to correct it the radius of curvature at the fifth surface $r_5$ need be small.

Accordingly it becomes difficult to sufficiently secure essential working distance.

The condition (2) relates to the shape of positive meniscus lens in the second component $G_2$ and is provided for good correction of coma and for well balancing spherical aberration at fifth surface $r_5$ in association with the above condition (1). If the lower limit of the condition (2) is exceeded, sine condition is under corrected, while if the upper limit is exceeded, sine condition is over corrected. In any case, it is difficult to well correct it depending upon the other component. If the lower limit is further exceeded, the spherical aberration at the fifth surface $r_5$ is increased, so that the amount of correction at the cemented surface $r_2$ in the first component $G_1$ must be larger. As a result, it becomes difficult to keep stability in production in such a manner as if the lower limit of the condition (1) is exceeded.

It is more desirable from the viewpoint of the balancing of various aberrations that when each of refractive indexes of positive lens and negative lens in the first component $G_1$ is designated by $n_1$, $n_2$, a refractive index of positive meniscus lens in the second component $G_2$ is shown by $n_3$ and a total focal distance of an entire system is designated by f in such a structure of the present invention, the structuure is made in such a range that $$-1.1 \leq \frac{n_2}{n_1} \cdot \frac{f}{r_2} \leq -0.8$$

$$1.1 \leq \frac{(n_3 - 1)r_5}{f} \leq 1.7$$

Numerical data of some embodiments according to the present invention are shown in the following:

In any of embodiments, N.A. of the objective lens is in the order of 0.47 and aberration correction inclusive of a plane parallel plate D made of polycarbonate as a cover glass having a thickness of t and having a disc surface $r_7$ as an object plane, is effected. A value corresponding to essential working distance, that is, a distance s from an apex of final lens surface $r_5$ to a disc surface $r_6$ is more than half of focal distance f.

In each of the following tables, it is noted that $r_1$, $r_2$, $r_3$, . . . show radii of curvature of individual lenses in succession from farther conjugate point side, namely the opposite side to the disc; $d_1$, $d_2$, $d_3$, . . . show center thicknesses of individual lenses and air spacings between respective lenses; $n_1$, $n_2$, $n_3$ show refractive indexes of individual lenses for a wavelength $\lambda = 780$ nm; and $\nu_1$, $\nu_2$, $\nu_3$ show Abbe numbers for a reference of d-line ($\lambda = 587.6$ nm).

First Embodiment

| | f = 1.0 | | N.A. = 0.47 | |
|---|---|---|---|---|
| | s = 0.5524 | | t = 0.2759 | |
| $r_1 =$ | 1.8750 | $d_1 =$ 0.3218 | $n_1 =$ 1.61337 | $\nu_1 =$ 60.29 |
| $r_2 =$ | −1.2271 | $d_2 =$ 0.1379 | $n_2 =$ 1.83794 | $\nu_2 =$ 23.0 |
| $r_3 =$ | −5.2577 | $d_3 =$ 0.0230 | | |
| $r_4 =$ | 0.7506 | $d_4 =$ 0.2529 | $n_3 =$ 1.88646 | $\nu_3 =$ 35.76 |
| $r_5 =$ | 1.6818 | | | |

Second Embodiment

| | f = 1.0 | | N.A. = 0.47 | |
|---|---|---|---|---|
| | s = 0.5527 | | t = 0.2759 | |
| $r_1 =$ | 2.1275 | $d_1 =$ 0.3218 | $n_1 =$ 1.61337 | $\nu_2 =$ 60.29 |
| $r_2 =$ | −1.2314 | $d_2 =$ 0.1379 | $n_2 =$ 1.83794 | $\nu_2 =$ 23.0 |
| $r_3 =$ | −3.8621 | $d_3 =$ 0.0230 | | |
| $r_4 =$ | 0.7194 | $d_4 =$ 0.2529 | $n_3 =$ 1.88646 | $\nu_3 =$ 35.76 |
| $r_5 =$ | 1.4061 | | | |

Third Embodiment

| | f = 1.0 | | N.A. = 0.47 | |
|---|---|---|---|---|
| | s = 0.5523 | | t = 0.2759 | |
| $r_1 =$ | 1.7838 | $d_1 =$ 0.3220 | $n_1 =$ 1.61337 | $\nu_1 =$ 60.29 |
| $r_2 =$ | −1.2119 | $d_2 =$ 0.1380 | $n_2 =$ 1.83794 | $\nu_2 =$ 23.0 |
| $r_3 =$ | −6.1420 | $d_3 =$ 0.0230 | | |
| $r_4 =$ | 0.7658 | $d_4 =$ 0.2530 | $n_3 =$ 1.88646 | $\nu_3 =$ 35.76 |
| $r_5 =$ | 1.8340 | | | |

Fourth Embodiment

| | f = 1.0 | | N.A. = 0.47 | |
|---|---|---|---|---|
| | s = 0.5538 | | t = 0.2759 | |
| $r_1 =$ | 2.0326 | $d_1 =$ 0.3219 | $n_1 =$ 1.68825 | $\nu_1 =$ 55.61 |
| $r_2 =$ | −1.0798 | $d_2 =$ 0.1379 | $n_2 =$ 1.83794 | $\nu_2 =$ 23.0 |
| $r_3 =$ | −9.8108 | $d_3 =$ 0.0230 | | |
| $r_4 =$ | 0.7599 | $d_4 =$ 0.2529 | $n_3 =$ 1.88646 | $\nu_3 =$ 35.76 |
| $r_5 =$ | 1.8392 | | | |

Third order aberration coefficient of spherical aberration for every lens surfaces in each of embodiments is shown in the table given below:

In the table, third order aberration coefficient for every lens surfaces in a first embodiment of known lens disclosed in the Japanese laid-open patent application No. 4068/1980 as stated above is shown for the purpose of comparison.

TABLE (Third order aberration coefficient of spherical aberration)

| | 1st embodiment | 2nd embodiment | 3rd embodiment | 4th embodiment | known embodiment |
|---|---|---|---|---|---|
| $r_1$ | 0.03575 | 0.02447 | 0.04152 | 0.02876 | 0.01269 |
| $r_2$ | −0.17991 | −0.16681 | −0.19016 | −0.17283 | −0.36615 |
| $r_3$ | 0.05436 | 0.08356 | 0.04495 | 0.03016 | 0.14820 |
| $r_4$ | 0.06628 | 0.07947 | 0.06067 | 0.07068 | 0.09832 |
| $r_5$ | 0.14278 | 0.09941 | 0.16471 | 0.16446 | 0.24809 |
| $r_6$ | −0.10390 | −0.10390 | −0.10395 | −0.10391 | −0.0951 |
| $r_7$ | 0.000 | 0.000 | 0.000 | 0.000 | 0.000 |
| Total | 0.01537 | 0.01621 | 0.01775 | 0.01733 | 0.04605 |

In the known embodiment shown in the table, the third order aberration coefficient corresponding to spherical aberration at the second surface $r_2$ is maximum and −0.36615, and the value at fifth surface $r_5$ is second and 0.24809. In each of embodiments according to the present invention, the value of the coefficient I at the second surface $r_2$ is about half of that of the known embodiment and the value at the fifth surface $r_5$ is remarkably small.

In this way, spherical aberration at the second surface $r_2$ as a cemented surface of the known embodiment is remarkably over-corrected and therefore this is offset by a great deal of aberrations at the fifth surface $r_5$. For this reason, accuracy in process and in combination at the second surface $r_2$ and at the fifth surface $r_5$ greatly affect an imaging performance, so that it was difficult to make the imaging performance stable at mass-production. In contrast, the maximum value of the coefficient I corresponding to spherical aberration is at the second surface $r_2$ in the present invention, but the value is about half and small one. Therefore, it is understood that the degree of deterioration in performance at this surface is substantially half. This holds true at the fifth surface $r_5$. From the comparison of these third order aberration coefficients, it is understood that the objective lens according to the present invention is stabler in the production process.

Various aberration graphs of respective embodiments of first to fourth are shown in FIGS. 2 to 5 in succession. Each of aberration-graphs shows spherical aberration, astigmatism, meridional coma and distortion. It is obvious from each of aberration graphs that any of embodiments has N.A. of about 0.47 and a working distance of about half of focal distance and is small in size and light in weight, as yet has very good performance. In addition, it is apparent from intermediate part of spherical aberration curve having small bulge that amount of high order aberration is small and low order aberration is already well corrected. This is coincident with the fact that the absolute value of third order aberration coefficient for every surfaces is small.

In the foregoing, the objective lens of the present invention, has N.A. in the order of 0.47 and sufficient working distance and yet excellent imaging performance and in addition amount of aberration at each of lens surfaces is small, so that the stability in production is high and it is possible to keep high imaging performance in mass production.

We claim:

1. An objective lens for detecting information recorded on an optical disc at high density, comprising, in succession from farther conjugate point side of the objective lens toward nearer conjugate point side, first lens composed of a positive lens and a negative lens cemented together and having a positive total refractive power, and second lens of a positive meniscus lens whose concave surface faces toward the nearer conjugate point side, and further satisfying the conditions;

$$1.1 < \frac{r_3 + r_2}{r_3 - r_2} < 2.0$$

$$2.1 < \frac{r_5 + r_4}{r_5 - r_4} < 3.5$$

wherein $r_2$, $r_3$ show the radii of curvature of the cemented surface of the first lens and of the surface of the nearer conjugate point side, respectively and $r_4$, $r_5$ show the radii of curvature of the surface of the second lens at the farther conjugate point side and of the surface at the nearer conjugate point side, respectively.

2. An objective lens according to claim 1, further satisfying the following conditions when the refractive indexes of the positive and the negative lens together constituting said first lens are $n_1$, $n_2$, respectively, the refractive index of the positive meniscus lens constituting said second lens is $n_3$ and the total focal distance of an entire system, is f, $$-1.1 \leq \frac{n_2}{n_1} \cdot \frac{f}{r_2} \leq -0.8$$

$$1.1 \leq \frac{(n_3 - 1)r_5}{f} \leq 1.7$$

3. An objective lens according to claim 2, having the numerical data substantially as set forth in the following table:

| | f = 1.0 | | N.A. = 0.47 | |
|---|---|---|---|---|
| | s = 0.5524 | | t = 0.2759 | |
| $r_1 =$ 1.8750 | $d_1 =$ 0.3218 | $n_1 =$ 1.61337 | $\nu_1 =$ 60.29 |
| $r_2 =$ −1.2271 | $d_2 =$ 0.1379 | $n_2 =$ 1.83794 | $\nu_2 =$ 23.0 |
| $r_3 =$ −5.2577 | $d_3 =$ 0.0230 | | |
| $r_4 =$ 0.7506 | $d_4 =$ 0.2529 | $n_3 =$ 1.88646 | $\nu_3 =$ 35.76 |
| $r_5 =$ 1.6818 | | | | wherein s is the axial distance between the second lens and the optical disc, t is the thickness of the optical disc, $r_1$, $r_2$, $r_3$ . . . represent the radii of curvature of the individual lens surfaces in succession from the farther conjugate point side, $d_1$, $d_2$, $d_3$, . . . represent central thicknesses of the individual lenses and air spacings between the lenses, $n_1$, $n_2$, $n_3$ represent refractive indexes of the individual lenses for the wavelength of $\lambda = 780$ nm and $\nu_1$, $\nu_2$, $\nu_3$ represent Abbe numbers of the individual lenses for a reference of d-line ($\lambda = 587.6$ nm).

4. An objective lens according to claim 2, having the numerical data substantially as set forth in the following table:

| | f = 1.0 | | N.A. = 0.47 | |
|---|---|---|---|---|
| | s = 0.5527 | | t = 0.2759 | |
| $r_1 =$ 2.1275 | $d_1 =$ 0.3218 | $n_1 =$ 1.61337 | $\nu_1 =$ 60.29 |
| $r_2 =$ −1.2314 | $d_2 =$ 0.1379 | $n_2 =$ 1.83794 | $\nu_2 =$ 23.0 |
| $r_3 =$ −3.8621 | $d_3 =$ 0.0230 | | |
| $r_4 =$ 0.7194 | $d_4 =$ 0.2529 | $n_3 =$ 1.88646 | $\nu_3 =$ 35.76 |
| $r_5 =$ 1.4061 | | | | wherein s is the axial distance between the second lens and the optical disc, t is the thickness of the optical disc, $r_1$, $r_2$, $r_3$, . . . represent the radii of curvature of the individual lens surfaces in succession from the farther conjugate point side, $d_1$, $d_2$, $d_3$ . . . represent central thicknesses of the individual lenses and air spacings between the lenses, $n_1$, $n_2$, $n_3$ represent the refractive indexes of the individual lenses for the wavelength of $\lambda = 780$ nm and $\nu_1$, $\nu_2$, $\nu_3$ represent Abbe numbers of the individual lenses for a reference of d-line ($\lambda = 587.6$ nm).

5. An objective lens according to claim 2, having the numerical data substantially as set forth in the following table:

| | f = 1.0 | | N.A. = 0.47 | |
|---|---|---|---|---|
| | s = 0.5523 | | t = 0.2759 | |
| $r_1 =$ 1.7838 | $d_1 =$ 0.3220 | $n_1 =$ 1.61337 | $\nu_1 =$ 60.29 |
| $r_2 =$ −1.2119 | $d_2 =$ 0.1380 | $n_2 =$ 1.83794 | $\nu_2 =$ 23.0 |
| $r_3 =$ −6.1420 | $d_3 =$ 0.0230 | | |
| $r_4 =$ 0.7658 | $d_4 =$ 0.2530 | $n_3 =$ 1.88646 | $\nu_3 =$ 35.76 |
| $r_5 =$ 1.8340 | | | | wherein s is the axial distance between the second lens and the optical disc, t is the thickness of the optical disc, $r_1$, $r_2$, $r_3$, . . . represent the radii of curvature of the individual lens surfaces in succession from the farther conjugate point side, $d_1$, $d_2$, $d_3$ . . . represent central thicknesses of the individual lenses and air spacings between the lenses, $n_1$, $n_2$, $n_3$ represent the refractive indexes of the individual lenses for the wavelength of $\lambda = 780$ nm and $\nu_1$, $\nu_2$, $\nu_3$ represent Abbe numbers of the individual lenses for a reference of d-line ($\lambda = 587.6$ nm).

6. An objective lens according to claim 2, having the numerical data substantially as set forth in the following table:

| | f = 1.0 | | N.A. = 0.47 | |
|---|---|---|---|---|
| | s = 0.5538 | | t = 0.2759 | |
| $r_1 =$ 2.0326 | $d_1 =$ 0.3219 | $n_1 =$ 1.68825 | $\nu_1 =$ 55.61 |
| $r_2 =$ −1.0798 | $d_2 =$ 0.1379 | $n_2 =$ 1.83794 | $\nu_2 =$ 23.0 |
| $r_3 =$ −9.8108 | $d_3 =$ 0.0230 | | |
| $r_4 =$ 0.7599 | $d_4 =$ 0.2529 | $n_3 =$ 1.88646 | $\nu_3 =$ 35.76 |
| $r_5 =$ 1.8392 | | | | wherein s is the axial distance between the second lens and the optical disc, t is the thickness of the optical disc, $r_1, r_2, r_3, \ldots$ represent the radii of curvature of the individual lens surfaces in succession from the farther conjugate point side, $d_1, d_2, d_3 \ldots$ represent central thicknesses of the individual lenses and air spacings between the lenses, $n_1, n_2, n_3$ represent the refractive indexes of the individual lenses for the wavelength of $\lambda = 780$ nm and $\nu_1, \nu_2, \nu_3$ represent Abbe numbers of the individual lenses for a reference of d-line ($\lambda = 587.6$ nm).

* * * * *